United States Patent [19]

Arquie et al.

[11] 4,414,657
[45] Nov. 8, 1983

[54] MOVING SYSTEM FOR A VIDEODISK READER-RECORDER

[75] Inventors: Louis Arquie; Michel Thirouard, both of Paris, France

[73] Assignee: Thomson-CSF, Paris, France

[21] Appl. No.: 226,905

[22] Filed: Jan. 21, 1981

[30] Foreign Application Priority Data

Jan. 24, 1980 [FR] France .............................. 80 01525

[51] Int. Cl.³ .............................................. G11D 7/08
[52] U.S. Cl. ..................................................... 369/45
[58] Field of Search ..................... 369/44, 45, 46, 219, 369/220, 221, 223; 360/77, 78, 104–107, 109; 358/342; 251/201

[56] References Cited

U.S. PATENT DOCUMENTS

| 3,530,258 | 9/1970 | Gregg et al. | 369/45 |
| 4,092,529 | 5/1978 | Aihara et al. | 369/44 |
| 4,135,083 | 1/1979 | Van Alem et al. | 369/45 X |
| 4,302,830 | 11/1981 | Hamaoka et al. | 369/45 |
| 4,318,145 | 5/1982 | Frandsen | 360/106 |
| 4,321,701 | 3/1982 | Arquie et al. | 369/45 |

FOREIGN PATENT DOCUMENTS

| 12650 | 6/1980 | European Pat. Off. | 369/44 |
| 33047 | 8/1981 | European Pat. Off. | 369/44 |

Primary Examiner—Bernard Konick
Assistant Examiner—Donald McElheny, Jr.
Attorney, Agent, or Firm—Oblon, Fisher, Spivak, McClelland & Maier

[57] ABSTRACT

The track of a videodisk is followed by a reading light beam produced by a device comprising a reading head fixed on a carriage which forms part of the moving system of a videodisk reader-recorder and is capable of radial displacement along the disk. An objective support frame is capable of displacement in a vertical direction with respect to the carriage in order to maintain focusing of the reading beam and of rotational displacement with respect to the carriage about a transverse axis at right angles to the radial and vertical axes in order to maintain the light beam on the track-following path. Flat coils located vertically in a plane parallel to the carriage path and placed within air-gaps of magnetic circuits serve to develop vertical forces which lift the reading head and initiate the vertical and rotational displacements by means of a differential supply circuit.

7 Claims, 3 Drawing Figures

MOVING SYSTEM FOR A VIDEODISK READER-RECORDER

BACKGROUND OF THE INVENTION

1. Field of the Invention

This invention relates to moving systems for carrying out displacement of the optical head of a videodisk reader-recorder in the radial direction along the disk in order to follow the information-carrying track. In addition, the moving systems serve to maintain focusing of the objective with which said head is provided as well as to carry out fine following of the track. The invention further relates to the videodisk reader-recorders which are equipped with a moving system of this type as well as to readers and recorders alone.

2. Description of the Prior Art

A well-known design of moving system consists of a carriage which is displaced by means of a lead-screw. The reading head placed on said carriage accordingly comprises an objective placed within a magnetic pot which is similar to the motor of a loudspeaker and serves to maintain focusing of said objective on the disk. Fine following of the track is performed by means of a reflecting mirror mounted on the frame of a galvanometer.

In French patent Application No 78 34 649 filed by the present Applicant on Dec. 8th, 1978 under the title: "A device providing access to a track carried by an optically-readable recordable medium, and an optical system comprising a device of this type", and corresponding to U.S. Pat. No. 4,321,701, there was described a moving system formed essentially by a flat coil of very small thickness and very light weight clamped between two glass plates and capable of both vertical and longitudinal displacement within the air-gap of a magnetic circuit. Track-following is performed by means of two vertical wires and the reading elements are formed by a semiconductor laser and a detector diode which are fixed directly on said moving system.

Although the device just mentioned is of very small mass and is therefore conducive to very low inertia forces, mechanical guidance is difficult to achieve and results in couplings between the track-following and focusing functions. Moreover, the use of simple vertical electric wires for track-following makes it possible to obtain only a low force for the motion control which is necessary for said track-following operation in spite of the need for electric currents which have high values and are therefore difficult to utilize in practice.

SUMMARY OF THE INVENTION

In order to overcome these disadvantages, the invention proposes a moving system for a videodisk reader-recorder, of the type comprising an objective which serves to focus a light beam on a track carried by a videodisk along a first axis substantially perpendicular to the disk, a carriage adapted to support said objective and means for displacing said carriage radially with respect to said disk along a second axis so as to follow the track. The moving system is mainly distinguished by the fact that it comprises in addition a frame for supporting the objective, means for joining said frame to said carriage whereby said frame is permitted to carry out a first longitudinal movement with respect to the carriage along the first axis in order to maintain focusing of the light beam on the disk and to carry out a second movement of rotation with respect to said carriage about a third axis perpendicular to the first two axes in order to maintain the focal point of the light beam on the track of the disk. Provision is made for at least one first pair of flat coils attached to the frame in a plane at right angles to the third axis and symmetrically with respect to the first axis said coils being capable of developing forces which initiate the first and the second movement when said coils carry electric currents and are placed in magnetic fields.

Further distinctive features and advantages will become readily apparent from the following description which is given solely by way of example and not in any limiting sense, especially in regard to the numerical values mentioned. It will be understood that the apparatus designated hereinafter as a reader may equally well consist of either a recorder or a reader-recorder.

DETAILED DESCRIPTION OF THE PREFERRED EMBODIMENT

Figure 1:
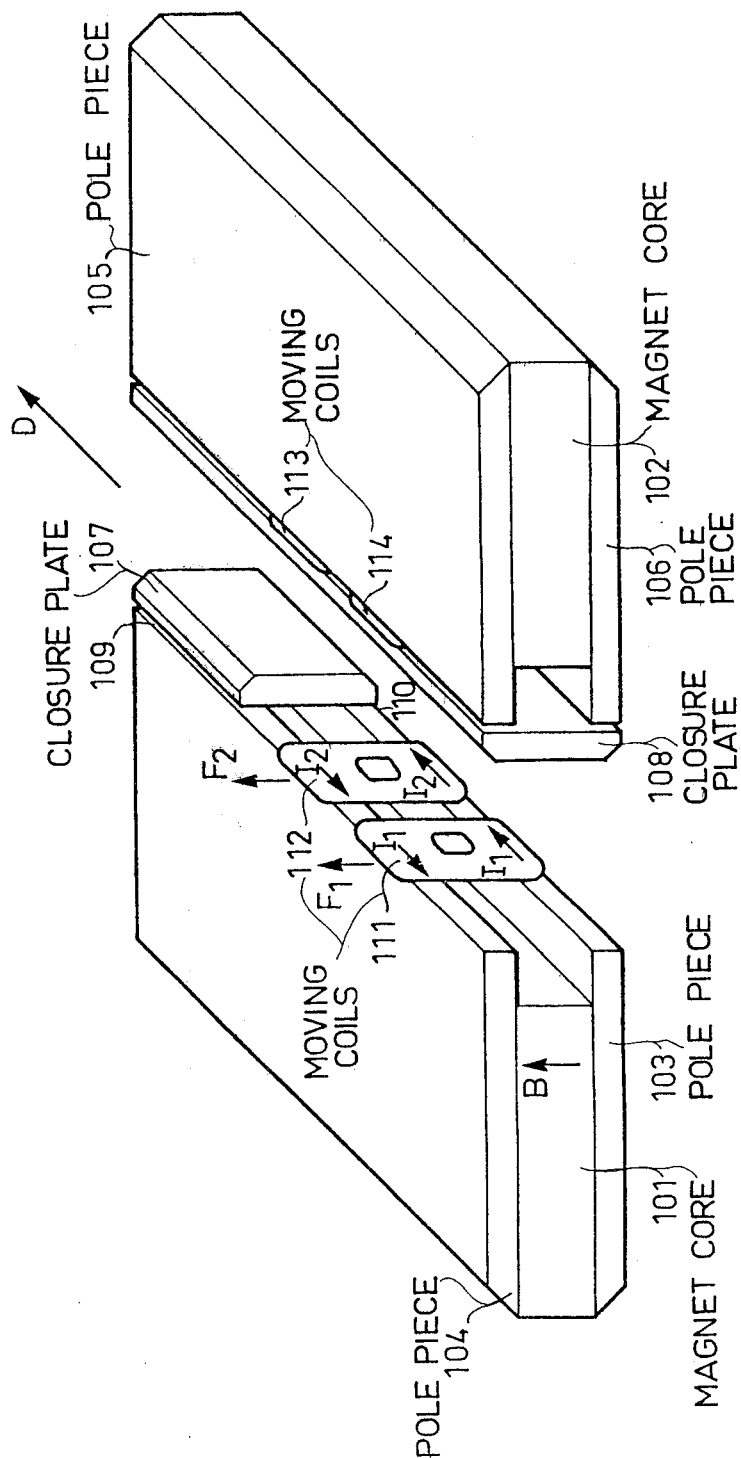
FIG. 1 illustrates the magnetic parts and the windings employed for maintaining focusing and track-following of the moving system of a reader-recorder.

In FIG. 1, only the pole-pieces of the videodisk reader and the magnetic coils of the moving system have been illustrated in order to show more clearly the forces exerted on the moving system by means of said coils and the kinematics of the system as a whole.

In order to read the track carried by the disk, the moving system must travel along a radial path D with respect to said disk. On each side of said path are placed two assemblies which serve to generate magnetic fields and comprise magnets 101 and 102. Pole-pieces 103 to 106 placed on each magnet so as to cover the top and bottom faces of these latter project towards the space formed between said magnets so as to form noses which guide the magnetic flux. Said magnetic flux is closed by means of two armatures or so-called closure plates 107 and 108 which provide a connection between the pole-pieces 103 and 104 on one side and between the pole-pieces 105 and 106 on the other side. Said connecting closure plates 107 and 108 are separated from the pole-pieces by shims (not shown in the figure) which are located at both ends, thus making it possible to form air-gaps such as those designated by the reference numerals 109 and 110. Uniform magnetic fields are developed within said air-gaps, namely in one direction in the case of the upper pole-piece and in the other direction in the case of the lower pole-piece. The air-gaps have a thickness of the order of 5/10th of a millimeter.

Two coupled pairs of flat coils circulate within said air-gaps. One pair which is formed by the coils 111 and 112 circulates within the air-gaps 109 and 110 of the magnetic assembly shown on the left-hand side of the figure and another pair circulates within the air-gaps of the right-hand magnetic assembly. Said flat coils are of substantially rectangular shape, are coupled together mechanically and project above the air-gap 109 and below the air-gap 110. Currents I1 and I2 pass respectively through said coils and are generated by the circuits for controlling the displacement of the moving system of the reader. Since the operation is the same in the case of both the right-hand apir of coils and the left-hand pair of coils, the explanation given hereinafter will accordingly be limited to the left-hand pair of coils in which part of the closure plate 107 has been removed in the figure in order to expose the coils and make them visible.

The currents I1 and I2 flow in one direction in the case of that portion of the coils which is located within the air-gap 109 and in the other direction in the case of that portion of said coils which is located within the air-gap 110. The magnetic field B induced by the magnet 101 passes out of the pole-piece 104 in one direction, passes in a feedback loop through the closure plate 107 and enters the pole-piece 103 in the other direction.

The interaction between the currents I1 and I2 and the magnetic field within the air-gaps 109 and 110 produces electromagnetic forces which, by finding the resultant of directions in accordance with known rules, lead to the conclusion that said forces are directed towards the top of the figure and therefore in the direction opposite to gravity. In consequence, these forces have a tendency to compensate for the influence of gravity and the circuits which generate the currents I1 and I2 make it possible to adjust the value of said currents I1 and I2 in accordance with a focusing error signal and follow-up control. Said value is so adjusted that, in cooperation with forces of the same nature and developed in both coils of the right-hand portion of the figure, the forces F1 and F2 compensate for the weight of the coils themselves as well as for the weight of the remainder of the moving system which is capable of displacement under the action of gravity. Said forces F1 and F2 also permit displacement of said moving system in order to maintain the focus.

Moreover, said circuits serve to supply the coils 111 and 112 in a differential manner in order to ensure that, while the sum of forces F1 and F2 remains constant, the difference between these forces may vary either in one direction or in another. The coils are thus subjected to a couple which permits pivotal motion of the coils about an axis located at right angles to these latter in their plane of symmetry.

Figure 2:
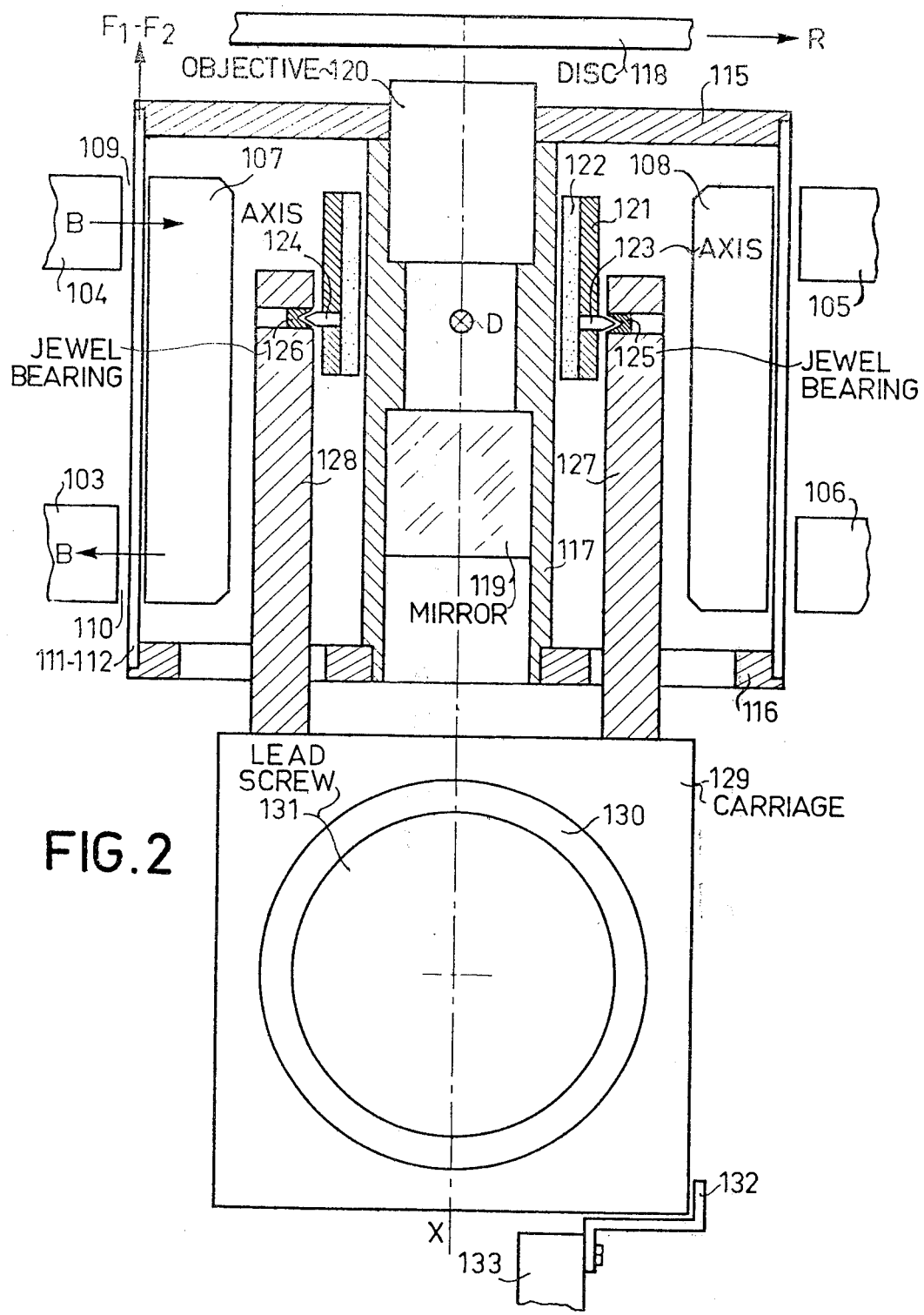
FIG. 2 is a sectional view illustrating the moving system of a reader-recorder.

FIG. 2 shows the pole-piece 103 to 106, the coils 111 to 114, and the closure plates 107 and 108.

The coils 111 to 114 are formed of enameled copper wire 15/100ths of a millimeter in diameter, 60 turns of said wire being wound in a single thickness so as to form a flat coil having a substantially square shape and having dimensions of approximately 2×2 cm. The winding operation is carried out between two mandrels spaced at a distance of approximately 20/100ths of a millimeter while coating the wire with an adhesive of the epoxy type progressively as said wire is being wound. After polymerization, the mandrels are separated and the desired coil is thus obtained. A coil of this type weighs approximately 1 gram.

Said coils are bonded directly to two plates of light alloy, namely an upper plate 115 and a lower plate 116; these latter serve to form with the coils a cage which is open at both ends and has substantially the shape of a rectangular parallelpiped. Said plates 115 and 116 are extensively perforated on the one hand so as to permit insertion of elements described in detail hereinafter and on the other hand in order to reduce the weight of the complete assembly. The quantity of metal left after completion of this operation is just sufficient to ensure rigidity of the assembly.

A tube segment 117 having a carefully ground outer surface is placed vertically between the center of the plate 115 and the center of the plate 116 and defines a vertical axis X which will also be an axis of symmetry of the moving system as a whole. The lower end of said tube segment is externally recessed to a slight extent so as to permit insertion of said tube end within a circular opening formed in the member 116. The upper end of said tube segment is internally recessed to a slight extent so as to maintain a reading objective which will serve to read the track carried by the videodisk 118. Said objective 120 is introduced simultaneously within the recess formed within the tube segment 117 and within a circular opening formed in the plate 115. The tube segment 117 is also provided with an internal recess or counterbore from the lower end to substantially the mid-height of the tube so as to permit introduction of a mirror 119 which is inclined to the axis X at 45°. In consequence, said mirror is also inclined at an angle of 45° to the direction D (looking on the end in the figure) which is perpendicular to the axis X. Said mirror serves to reflect towards the objective 120 a light beam emerging from a source located outside the space provided for the moving system. Said mirror also serves to reflect the reading light beam to a detector located outside the same space, said reading light beam being returned to the objective 120 after reflection from the disk 118.

The tube 117 is slidably mounted within a sleeve 121 fitted with an internal ring 122. Said sleeve is of light alloy and the internal ring is formed of an anti-friction compound. The tube 117 is mounted with a clearance of approximately 50 microns with respect to the ring 122. It has been found that, as a result of self-centering produced by the continuous movements of the device for correcting focusing variations, the tube 117 was centered within the ring 122 with a degree of accuracy of the order of one micron.

The sleeve 121 is provided with two horizontal pivots 123 and 124 which are diametrically opposite in a direction perpendicular to the direction D.

Said pivots 123 and 124 are rotatably mounted on two socket bearings 125 and 126 which are force-fitted in two vertical arms 127 and 128.

Said vertical arms pass through two openings formed in the lower plate 116 and are fixed on a carriage 129 located beneath the plane of said plate 116.

Said carriage 129 is fitted with a nut which is designed for minimum working play and is of the ball-circuit type, for example.

In said nut is engaged a lead-screw 131, the axis of which is parallel to the direction D. Said lead-screw serves to displace the carriage 129 and therefore the moving system as a whole along a radius of the disk 118 in order to travel along the track carried by said disk when this latter rotates.

During its displacement, said carriage 129 is supported on a guide 132 fixed on a member 133 which forms an integral part of the videodisk reader frame. By way of example, said guide 132 is formed of beryllium bronze in order to have a certain degree of elasticity which is conducive to a steady guiding action without any hard point.

The videodisk 118 is therefore driven in rotation about an axis which is parallel to the axis X and located in the figure at a certain distance behind this latter. As is also apparent from the figure, the reading point is therefore displaced in the transverse direction R which is perpendicular to the direction D.

Figure 3:
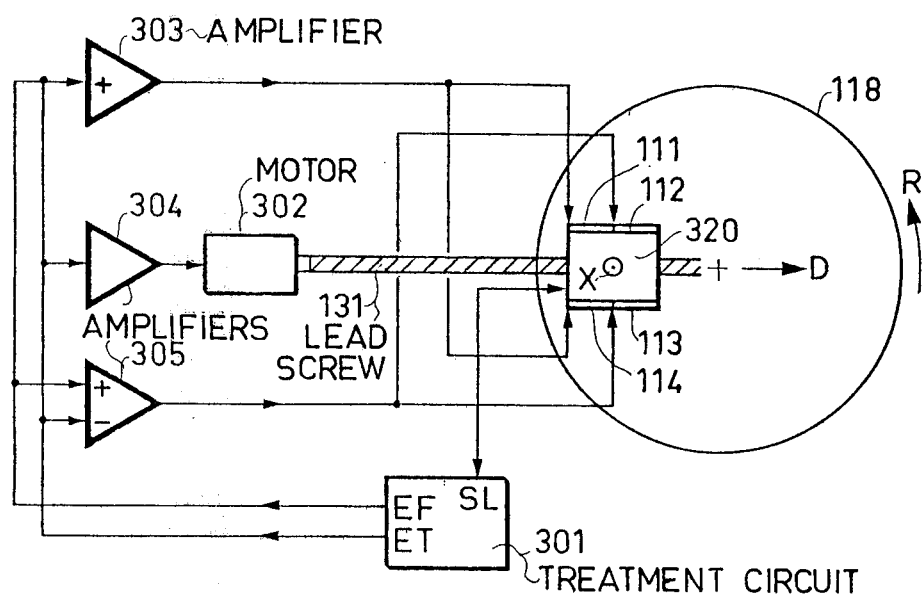
FIG. 3 is a diagram showing the control elements which supply the coils of said moving system.

In the schematic example of the device for supplying current to the coils of the moving system shown in FIG. 3, the videodisk is driven in rotation in the direction R. The reading head which is represented schematically by the element 320 is driven by the lead-screw 131 towards the center of the disk and subjected to the action of the coils 111 to 114.

The reading signal SL delivered by said reading head is applied to an electronic de-switching box or treatment circuit 301 which, among other signals, delivers a focusing error signal EF and a track-following error signal ET.

The signal EF supplies two amplifiers 303 and 305 which have a very high gain and are capable of delivering a very high output power. These amplifiers supply the coils 111 to 114 with currents which have the same intensity in respect of one and the same value of the signal EF. The high gain of the amplifiers makes it possible to obtain a strong current in respect of a minimum error voltage, which means that the servomechanism operates on the principle of position control, when adopting the coil dimensions already described, and in the case of a magnetic circuit which produces a field of the order of 1 Tesla within the air-gaps, a vertical force of 5 Newtons is obtained in respect of a peak current of 2 Amps, this value being obtained in a completely normal and standard manner without exposing either the amplifiers or the coils to any potential hazard. The weight of the vertically-moving system consisting essentially of the coils, the two plates 115 and 116, the objective, the tube 117 and the mirror 119 is of the order of 20 grams. The force thus obtained at a peak value is therefore substantially higher than the force required in order to support said vertically-moving system in a stable position and accordingly makes it possible to apply an acceleration of the order of 25 g to the vertically-moving system. It has been found that an acceleration of this order makes it possible to maintain focusing of the reading beam on a disk driven at a speed of rotation of 1500 revolutions per minute and having the poorest state of surface which is compatible with production of a utilizable reading signal.

The track-following error signal ET is first applied to an amplifier 304 and this latter supplies a motor 302 which drives the lead-screw 131 in rotation. There is thus obtained a mean forward movement of the moving system along a radius of the disk 118 which makes it possible to follow the mean pitch of the track carried by said disk.

In addition, said signal ET is applied on the one hand to the amplifier 303 in parallel with the signal EF and finally to the amplifier 305 at an input having a reversing function with respect to the input to which the signal EF is applied.

Inasmuch as the amplifier 303 supplies the coils 111 and 114 located on one side of the axis of rotation defined by the pivots 123 and 124 whilst the amplifier 305 supplies the coils 112 and 113 located on the other side of said axis, the action of the signal ET produces, for example, an increase in the current within the coils 111 and 114 and a correlative reduction in current within the coils 112 and 113 or of course conversely. This differential supply of the coils produces a dissymmetrical variation of the forces F1 and F2. In consequence, whereas the force F1, for example, increases to a predetermined extent, the force F2 decreases to the same extent. The assembly composed of the vertically-moving portion defined in the foregoing and of the sleeve 121 provided with its pivots 123 and 124 consequently has a tendency to carry out a pivotal displacement about the axis defined by said pivots which rest on the socket bearings 125 and 126. Under the action of this pivotal motion, the light radiation which impinges on the mirror 119 and is focused by the objective 120 on the disk undergoes a slight displacement in the radial direction on said disk. The different polarities of the electronic circuits are chosen so as to ensure that this pivotal displacement tends to reduce the track-following error signal ET to zero.

This track-following error arises essentially from the eccentric displacement of the disk with respect to its axis of rotation, which is of the order of 100 microns. Taking into account the speed of rotation of the disk, said eccentric displacement sets up a sinusoidal oscillation at 25 hertz of the portions of the moving system which oscillate about the axis defined by the pivots. Taking into account the weight of said oscillating portions, which is also of the order of 20 grams since the sleeve 121 provided with the pivots and with its internal ring is of very light weight, the differential force which is necessary in order to initiate this movement is of the order of 0.1 Newton. It is observed that this force is considerably smaller than the force which is necessary in order to obtain maximum vertical acceleration of the objective. Since it has already been noted that this maximum force was obtained readily and without difficulty, the same applies to this small differential force required for pivotal motion at maximum speed.

The sliding movement of the tube 117 within the anti-friction material which lines the interior of the ring 121 and the movement of rotation of the pivots 123 and 124 within the socket bearings 125 and 126 are mechanical movements which take place without any hard point by reason of the constructional design of the parts involved.

It is worthy of note, however, that the tube 117 is not only capable of sliding vertically within the ring 122 but that there is nothing to prevent it from rotating within said ring about the axis X. The limits to this angular displacement are accordingly defined by the application of the coils 111 to 114 against the pole-pieces 103 to 108. In order to limit any danger of jamming or even of hard points resulting from the constructional design of the coils, these latter have been encapsulated within an epoxy resin which is preferably of the same type as the resin employed for the initial winding operation. Encapsulation is performed by placing the coils between two finely ground and parallel plates lined with a demolding product. These plates were maintained in position for a sufficient length of time to ensure complete polymerization and an excellent state of surface was obtained at the time of removal from the mold. It has been found that, by allowing a clearance of approximately 100 microns between the coils and the armatures (this clearance being obtained by means of a suitable thickness of the shims which define the air-gaps), the guiding action thus obtained was such that no hard point interfered with either focusing or track-following.

In another embodiment, the reflecting mirror can be replaced by a light source such as a semiconductor laser, for example. In such a case, a photoelectric cell such as a photodiode can be associated with said light source.

What is claimed is:
1. A moving system for a videodisk reader-recorder of the type comprising an objective which serves to focus a light beam on a track carried by a videodisk along a first axis substantially perpendicular to the disk, a carriage adapted to support said objective and means for displacing said carriage radially with respect to said disk along a second axis so as to follow the track, wherein said moving system further comprises:

a frame for supporting the objective, means for joining said frame to said carriage whereby said frame is permitted to carry out a first longitudinal movement with respect to the carriage along the first axis in order to maintain focusing of the light beam on the disk and to carry out a second movement of rotation with respect to said carriage about a third axis perpendicular to the first two axes in order to maintain the focal point of the light beam on the track of the disk, magnetic field generation means having at least one magnet with two pole-pieces and one armature providing two air-gaps extending parallel to the direction of said second axis, one air-gap above the other air-gap with respect to said first axis, in which uniform magnetic fields are developed, in one direction for the upper pole-piece and in the other direction for the lower pole-piece and at least one first pair of flat coils attached to the frame in a plane at right angles to the third axis and symmetrical with respect to the first axis, said at least one first pair of flat coils circulating within said air-gaps in order, for each coil, to force current to flow parallel to the direction of said second axis and in one direction in a portion of said coil which is located within one of said air-gaps and in the other direction in a portion of said coil which is located within the other of said air-gaps, said coils developing forces which initiate said first and said second movement when said coils carry electric currents and are placed in said magnetic fields.

2. A moving system according to claim 1, wherein said system further comprises a mirror rigidly fixed to the frame for reflecting towards the objective a light beam issuing from a source located externally with respect to said moving system.

3. A moving system according to claim 1, wherein said system further comprises a light source and a photoelectric detector rigidly fixed to the frame.

4. A moving system according to claim 1, wherein said system further comprises a second pair of flat coils attached to the frame symmetrically with the first pair of coils with respect to the first axis.

5. A moving system according to claim 1, wherein the means which permit the first longitudinal movement comprise a circular tube attached to the frame and centered on the first axis, and a sleeve attached to the carriage within which said tube is capable of displacement in sliding motion.

6. A moving system according to claim 1, wherein the means which permit the second movement of rotation comprise two pivots fixed on each side of the sleeve and defining the third axis, and two socket bearings which are attached to arms supported by the carriage and against which the pivots are applied.

7. A videodisk reader-recorder comprising a moving system according to claim 1, a lead-screw which is parallel to the second axis and on which the carriage is engaged, a rail for guiding said carriage in a direction parallel to the second axis, at least one magnet provided with two pole-pieces and an armature, two air-gaps extending in the direction of the second axis and located one above the other being defined between said armature and said pole-pieces and traversed by magnetic fields which are parallel to the third axis and in opposite directions, and means for supplying the coils with electric currents as a function of a focusing error voltage and of a track-following error voltage, the first pair of coils being slidably mounted within said air-gaps so as to ensure that the electric current flows through the air-gaps in the direction of the second axis within the portions of coils located within said air-gaps and in opposite directions in the case of any one coil.

* * * * *